United States Patent
Mori et al.

(10) Patent No.: US 12,257,631 B2
(45) Date of Patent: Mar. 25, 2025

(54) SILVER NANOPARTICLES

(71) Applicant: OSAKA SODA CO., LTD., Osaka (JP)

(72) Inventors: Takamichi Mori, Osaka (JP);
Junichiro Minami, Osaka (JP);
Naruhito Iwasa, Osaka (JP);
Masatoshi Okuda, Osaka (JP)

(73) Assignee: OSAKA SODA CO., LTD, Osaka (JP)

( * ) Notice: Subject to any disclaimer, the term of this patent is extended or adjusted under 35 U.S.C. 154(b) by 505 days.

(21) Appl. No.: 17/250,764

(22) PCT Filed: Sep. 2, 2019

(86) PCT No.: PCT/JP2019/034347
§ 371 (c)(1),
(2) Date: Mar. 2, 2021

(87) PCT Pub. No.: WO2020/050194
PCT Pub. Date: Mar. 12, 2020

(65) Prior Publication Data
US 2021/0346949 A1    Nov. 11, 2021

(30) Foreign Application Priority Data

Sep. 3, 2018 (JP) .................................. 2018-164872

(51) Int. Cl.
*C09J 9/02*     (2006.01)
*B22F 1/05*     (2022.01)
(Continued)

(52) U.S. Cl.
CPC .................. *B22F 7/08* (2013.01); *B22F 1/05* (2022.01); *B22F 1/0545* (2022.01); *B22F 1/07* (2022.01);
(Continued)

(58) Field of Classification Search
None
See application file for complete search history.

(56) References Cited

U.S. PATENT DOCUMENTS

2011/0140162 A1    6/2011    Okada et al.
2016/0121432 A1    5/2016    Watanabe et al.

FOREIGN PATENT DOCUMENTS

JP    2015-159096 A    9/2015
JP    2017-066501 A    4/2017
(Continued)

OTHER PUBLICATIONS

English machine translation of JPWO2020-040184, JPO, accessed Jan. 26, 2024.*

(Continued)

*Primary Examiner* — Xiaobei Wang
(74) *Attorney, Agent, or Firm* — Knobbe, Martens, Olson & Bear, LLP (57) ABSTRACT

The present invention provides silver nanoparticles that form a sintered body having a high shear strength and a low specific resistance when sintered at a low temperature (for example, 200° C. or less), even though the silver nanoparticles have an average particle diameter as large as 200 nm or more. Silver nanoparticles having an average particle diameter of 200 to 600 nm, wherein an exothermic peak due to binding of the silver nanoparticles in thermogravimetry-differential thermal analysis appears at less than 175° C., and a weight loss on heating from 30 to 500° C. by thermogravimetry-differential thermal analysis is 0.4% by weight or less.

9 Claims, 2 Drawing Sheets

(51) Int. Cl.
*B22F 1/0545* (2022.01)
*B22F 1/07* (2022.01)
*B22F 1/102* (2022.01)
*B22F 1/148* (2022.01)
*B22F 7/08* (2006.01)
*C09J 11/04* (2006.01)
*B22F 1/054* (2022.01)

(52) U.S. Cl.
CPC .............. *B22F 1/102* (2022.01); *B22F 1/148* (2022.01); *C09J 9/02* (2013.01); *C09J 11/04* (2013.01); *B22F 1/056* (2022.01); *B22F 2301/255* (2013.01); *Y10T 428/12181* (2015.01)

(56) References Cited

FOREIGN PATENT DOCUMENTS

WO    WO 2010/018712 A1    2/2010
WO    WO-2020040184 A1 *    2/2020

OTHER PUBLICATIONS

Extended European Search Report in EP Patent Application No. 19857559.9 issued Jan. 12, 2022.
International Search Report in PCT/JP2019/034347, mailed Nov. 19, 2019.

* cited by examiner

SILVER NANOPARTICLES

TECHNICAL FIELD

The present invention relates to silver nanoparticles, a conductive adhesive, a sintered body of the conductive adhesive, and a device comprising the sintered body between components.

BACKGROUND ART

Conductive adhesives, such as die-bonding agents, are bonding materials used in semiconductors, LEDs, power semiconductors, and the like. A commonly known bonding method involves bonding such a bonding material to a substrate, by bonding using pressure and heating, or by sintering using heating or the like without pressure. The development of bonding materials of the pressureless method has been recently ongoing, from the viewpoint of the efficiency and simplicity of the production process.

One example of bonding materials of the pressureless method is a conductive adhesive containing an epoxy resin. This bonding material is used by curing the epoxy resin by a low-temperature treatment, and can reduce the formation of voids, and improve the bonding strength to substrates (Patent Literature 1). However, because the epoxy resin itself is a resistor, the resulting conductivity and thermal conductivity are reduced.

The development of silver nanoparticles, as a bonding material not containing a thermosetting resin such as an epoxy resin, has been recently ongoing. Silver nanoparticles have the property of being easily sintered by a heat treatment at a low temperature in a short period of time. Patent Literature 2, for example, discloses a metal paste obtained by kneading solids composed of silver particles and a solvent, wherein the solids are composed of silver particles including 30% or more, in terms of the number of particles, of silver particles with particle diameters of 100 to 200 nm, and an amine compound containing 4 to 8 carbon atoms in total as a protective agent is bound to the silver particles constituting the solids. According to Patent Literature 2, this metal paste allows sintering of the silver particles at a temperature in a low-temperature range, and is also capable of forming a sintered body having low resistance or a sintered body having excellent thermal conductivity.

CITATION LIST

Patent Literature

Patent Literature 1: WO 2010/18712
Patent Literature 2: JP 2015-159096 A

SUMMARY OF INVENTION

Technical Problem

As described above, according to Patent Literature 2, the metal paste composed of silver particles including 30% or more, in terms of the number of particles, of silver particles with particle diameters of 100 to 200 nm, wherein an amine compound containing 4 to 8 carbon atoms in total as a protective agent is bound to the silver particles constituting the solids, allows sintering of the silver particles at a temperature in a low-temperature range, and is also capable of forming a sintered body having low resistance or a sintered body having excellent thermal conductivity.

However, as a result of research by the present inventors, they have found that a conventional metal paste containing silver nanoparticles as disclosed in Patent Literature 2 has the problem that when the silver nanoparticles have an average particle diameter of 200 nm or more, a sintered body obtained by sintering the silver nanoparticles at a low temperature, for example, 200° C. or less, has a low shear strength and a high specific resistance.

Under such circumstances, it is a main object of the present invention to provide silver nanoparticles that form a sintered body having a high shear strength and a low specific resistance when sintered at a low temperature (for example, 200° C. or less), even though the silver nanoparticles have an average particle diameter as large as 200 nm or more. It is also an object of the present invention to provide a conductive adhesive containing the silver nanoparticles, a sintered body of the conductive adhesive, and a device comprising the sintered body between components.

Solution to Problem

The present inventors have conducted extensive research to solve the aforementioned problem. As a result, they have found that silver nanoparticles having an average particle diameter of 200 to 600 nm, wherein an exothermic peak due to binding of the silver nanoparticles in thermogravimetry-differential thermal analysis appears at less than a predetermined temperature, and a weight loss on heating from 30 to 500° C. by thermogravimetry-differential thermal analysis is 0.4% by weight or less, form a sintered body having a high shear strength and a low specific resistance when sintered at a low temperature (for example, 200° C. or less), even though the silver nanoparticles have an average particle diameter as large as 200 nm or more. The present invention has been completed as a result of further research based on this finding.

In summary, the present invention provides aspects of the invention as set forth below:

Item 1: Silver nanoparticles having an average particle diameter of 200 to 600 nm, wherein
   an exothermic peak due to binding of the silver nanoparticles in thermogravimetry-differential thermal analysis appears at less than 175° C., and
   a weight loss on heating from 30 to 500° C. by thermogravimetry-differential thermal analysis is 0.4% by weight or less.

Item 2. The silver nanoparticles according to item 1, wherein an amine compound is adhered to a surface.

Item 3. A conductive adhesive comprising the silver nanoparticles according to item 1 or 2 and a solvent.

Item 4. A sintered body of the conductive adhesive according to item 3.

Item 5. A device in which components are bonded with the sintered body according to item 4.

Advantageous Effects of Invention

The present invention can provide silver nanoparticles that form a sintered body having a high shear strength and a low specific resistance when sintered at a low temperature (for example, 200° C. or less), even though the silver nanoparticles have an average particle diameter as large as 200 nm or more. The present invention can also provide a conductive adhesive containing the silver nanoparticles, a sintered body of the conductive adhesive, and a device comprising the sintered body between components.

DESCRIPTION OF EMBODIMENTS

Figure 1:
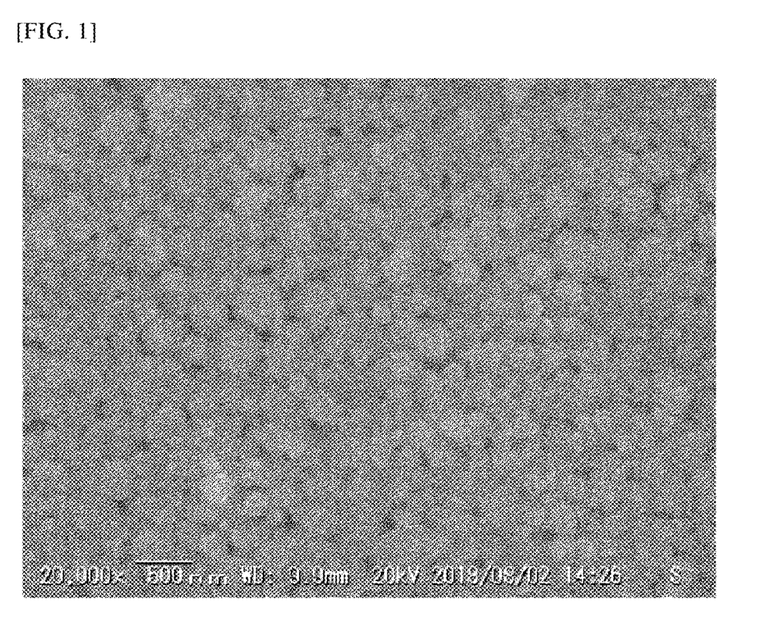
FIG. 1 is a SEM image of silver nanoparticles synthesized in Example 1.
Figure 2:
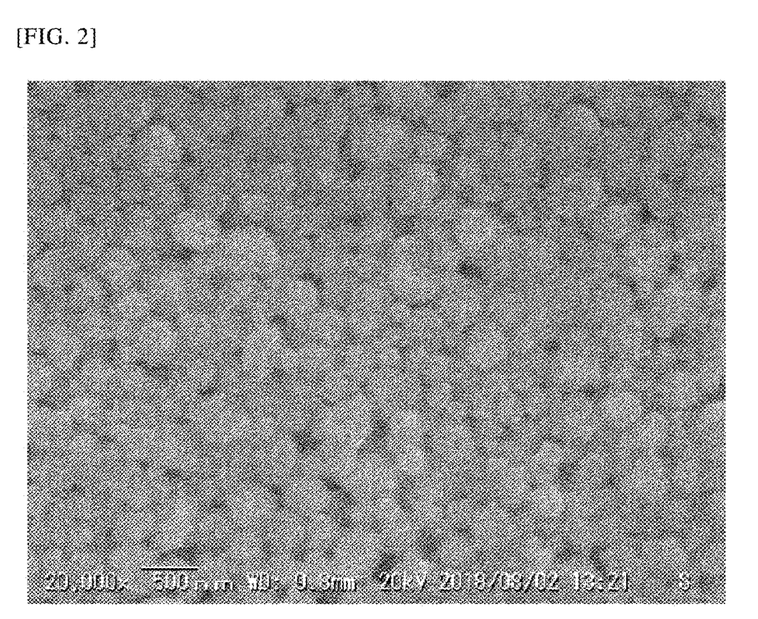
FIG. 2 is a SEM image of silver nanoparticles synthesized in Example 2.
Figure 3:
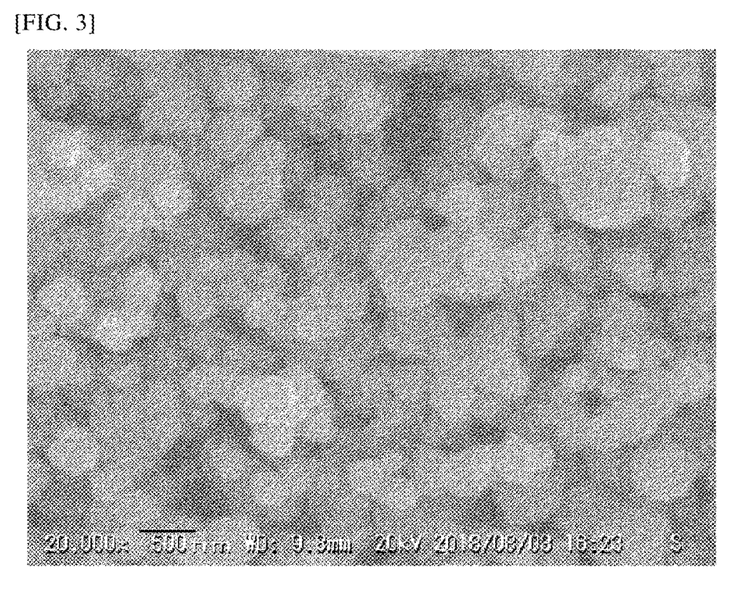
FIG. 3 is a SEM image of silver nanoparticles used in Comparative Example 1.
Figure 4:
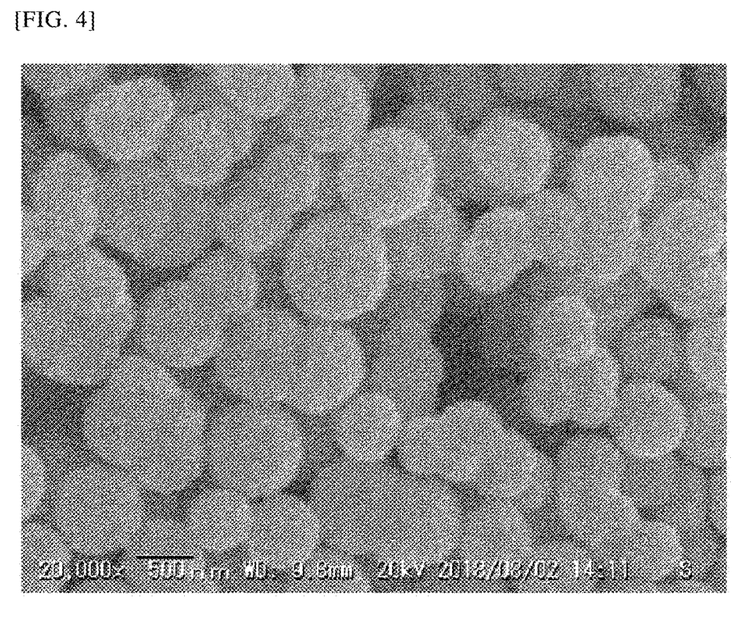
FIG. 4 is a SEM image of silver nanoparticles used in Comparative Example 2.

Silver nanoparticles of the present invention have an average particle diameter of 200 to 600 nm, and are characterized in that an exothermic peak due to binding of the silver nanoparticles in thermogravimetry-differential thermal analysis appears at less than 175° C., and a weight loss on heating from 30 to 500° C. by thermogravimetry-differential thermal analysis is 0.4% by weight or less. By virtue of these features, the silver nanoparticles of the present invention can exhibit the property of forming a sintered body having a high shear strength and a low specific resistance when sintered at a low temperature (for example, 200° C. or less), even though the silver nanoparticles have an average particle diameter as large as 200 nm or more.

The silver nanoparticles, the conductive adhesive, the sintered body of the conductive adhesive, and the device comprising the sintered body between components of the present invention will be hereinafter described in detail. As used herein, values connected with "to" refer to the numerical range including the values before and after "to" as the lower and upper limits. When a plurality of lower limits and a plurality of upper limits are mentioned separately, any lower limit and any upper limit may be selected and connected with "to".

1. Silver Nanoparticles

The silver nanoparticles of the present invention are particles containing silver, and have an average particle diameter of 200 to 600 nm. The lower limit of the average particle diameter of the silver nanoparticles is above 200 nm, preferably 230 nm or more, and more preferably 250 nm or more, while the upper limit is preferably 550 nm or less, and more preferably 500 nm or less.

<Average Particle Diameter>

In the present invention, the average particle diameter of the silver nanoparticles is determined by observing the silver nanoparticles with a scanning electron microscope (magnification: 20,000 times), randomly selecting 30 or more particles present in the field of view, measuring the particle diameters, and calculating the average value.

In the silver nanoparticles of the present invention, the proportion of the number of particles with particle diameters of 100 to 200 nm is preferably less than 30%, more preferably 20% or less, and still more preferably 15% or less. That is, in the silver nanoparticles of the present invention, from the viewpoint of achieving silver nanoparticles that form a sintered body having a high shear strength and a low specific resistance when sintered at a low temperature (for example, 200° C. or less), even though the silver nanoparticles have an average particle diameter as large as 200 nm or more, it is preferred that the average particle diameter be as large as 200 to 600 nm, and the number of particles with particle diameters of 100 to 200 nm be low. The proportion of the number of particles with particle diameters of 100 to 200 nm is the value determined by randomly selecting 30 or more particles present in the field of view, and measuring the particle diameters, in the above-described measurement of the average particle diameter.

The silver nanoparticles of the present invention are characterized in that an exothermic peak due to binding of the silver nanoparticles in thermogravimetry-differential thermal analysis appears at less than 175° C., and a weight loss on heating from 30 to 500° C. by thermogravimetry-differential thermal analysis is 0.4% by weight or less. In order to set the average particle diameter of the silver nanoparticles in the above-described range, and also impart these properties to the silver nanoparticles, it is preferred to adopt the below-described method for producing the silver nanoparticles.

The silver content in the silver nanoparticles of the present invention is preferably 95% by mass or more, and more preferably 98% by mass or more.

From the viewpoint of further improving the shear strength of the sintered body obtained by sintering at a low temperature, and simultaneously reducing the specific resistance, the lower limit of the above-described exothermic peak is preferably 120° C. or more, and more preferably 150° C. or more, while the upper limit is preferably less than 175° C., and more preferably 170° C. or less.

From the same viewpoint as described above, the lower limit of the above-described weight loss is preferably 0.01% by weight or more, and more preferably 0.05% by weight or more, while the upper limit is preferably 0.3% by weight or less, and more preferably 0.2% by weight or less.

<Thermogravimetry-Differential Thermal Analysis (TG-DTA)>

Initially, air-dried silver nanoparticles are prepared. For example, when silver nanoparticles obtained from a conductive adhesive are to be analyzed, 1 g of the conductive adhesive is dispersed well in 2 g of added methanol, and then the silver nanoparticles are collected by filtration and air-dried to obtain a silver-nanoparticle dry powder to be analyzed. TG-DTA measurement is performed on the silver-nanoparticle dry powder, using a thermogravimetry-differential thermal analyzer (for example, HITACHI G300 AST-2). The measurement conditions are as follows: atmosphere: air, measurement temperature: 30 to 500° C., heating rate: 10° C./min. From the obtained TG-DTA chart, the exothermic peak due to binding of the silver nanoparticles in the TG-DTA analysis and the weight loss on heating from 30 to 500° C. by the thermal analysis are acquired.

Although the crystallite diameter of the silver nanoparticles of the present invention is not limited, the lower limit is preferably 35 nm or more, and more preferably 40 nm or more, while the upper limit is preferably 60 nm or less, and more preferably 50 nm or less. The method of measuring the crystallite diameter of the silver nanoparticles of the present invention is as follows:

<Measurement of the Crystallite Diameter>

X-ray crystal structure analysis is performed using an x-ray crystal structure analyzer (for example, RIGAKU Ultima IV), using Cu Kα radiation as the radiation source. The crystallite diameter is calculated from the half-width of the (111) peak ($2\theta=38°$) in the obtained chart, using the Scherrer equation.

In order to set the average particle diameter of the silver nanoparticles in the above-described range, and also satisfactorily set the above-described exothermic peak and weight loss (and, moreover, the above-described crystallite diameter) of the silver nanoparticles in the above-described ranges, it is preferred to surface-treat the silver nanoparticles. That is, the silver nanoparticles of the present invention having the above-described physical properties are preferably surface-treated silver nanoparticles.

More specifically, in the silver nanoparticles of the present invention, it is preferred that an amine compound be adhered to at least a surface. The amine compound can be adhered to the surface of the silver nanoparticles to form a protective layer. In the silver nanoparticles of the present invention, it is preferred to adhere the amine compound such that the average particle diameter is set in the above-described specific range, and simultaneously the above-described physical properties are imparted.

Although the amine compound is not limited, it is preferably an alkylamine, from the viewpoint of setting the average particle diameter of the silver nanoparticles in the above-described range, and also satisfactorily set the above-described exothermic peak and weight loss of the silver nanoparticles in the above-described ranges. Although the alkylamine is not limited, it is preferably an alkylamine in which the alkyl group contains 3 or more and 18 or less carbon atoms, and is more preferably an alkylamine in which the alkyl group contains 4 or more and 12 or less carbon atoms.

Specific preferred examples of the alkylamine include ethylamine, n-propylamine, isopropylamine, 1,2-dimethylpropylamine, n-butylamine, isobutylamine, sec-butylamine, tert-butylamine, isoamylamine, tert-amylamine, 3-pentylamine, n-amylamine, n-hexylamine, n-heptylamine, n-octylamine, 2-octylamine, 2-ethylhexylamine, n-nonylamine, n-aminodecane, n-aminoundecane, n-dodecylamine, n-tridecylamine, 2-tridecylamine, n-tetradecylamine, n-pentadecylamine, n-hexadecylamine, n-heptadecylamine, n-octadecylamine, n-oleylamine, N-ethyl-1,3-diaminopropane, N,N-diisopropylethylamine, N,N-dimethylaminopropane, N,N-dibutylaminopropane, N,N-dimethyl-1,3-diaminopropane, N,N-diethyl-1,3-diaminopropane, N,N-diisobutyl-1,3-diaminopropane, and N-lauryl diaminopropane. Examples also include dibutyl amine, which is a secondary amine, and cyclopropylamine, cyclobutylamine, cyclopropylamine, cyclohexylamine, cycloheptylamine, and cyclooctylamine, which are cyclic alkylamines. From the viewpoint of effectively improving the mechanical strength of the sintered body of the conductive adhesive, preferred among the above are n-propylamine, isopropylamine, cyclopropylamine, n-butylamine, isobutylamine, sec-butylamine, tert-butylamine, cyclobutylamine, n-amylamine, n-hexylamine, cyclohexylamine, n-octylamine, 2-ethylhexylamine, n-dodecylamine, n-oleylamine, N,N-dimethyl-1,3-diaminopropane, and N,N-diethyl-1,3-diaminopropane; and more preferred are n-butylamine, n-hexylamine, cyclohexylamine, n-octylamine, n-dodecylamine, N,N-dimethyl-1,3-diaminopropane, and N,N-diethyl-1,3-diaminopropane. These amine compounds may be used alone or in combination.

In the silver nanoparticles of the present invention, the amount of the amine compound to be adhered is adjusted such that the exothermic peak due to binding of the silver nanoparticles in thermogravimetry-differential thermal analysis appears at less than 175° C., and a weight loss on heating from 30 to 500° C. by thermogravimetry-differential thermal analysis is 0.4% by weight or less. Specifically, the amount of the amine compound to be adhered may be 0.4% by weight or less, and is preferably 0.2% by weight or less, based on the weight of the silver nanoparticles. The amine compound content adhered to the silver nanoparticles can be measured by gas chromatography or thermogravimetry-differential thermal analysis.

A fatty acid, a hydroxyfatty acid, or the like may also be adhered to the surface of the silver nanoparticles. Although the fatty acid is not limited, it is preferably a fatty acid in which the alkyl group contains 3 or more and 18 or less carbon atoms, and is more preferably a fatty acid in which the alkyl group contains 4 or more and 18 or less carbon atoms. Specific preferred examples of the fatty acid include acetic acid, propionic acid, butyric acid, valeric acid, caproic acid, caprylic acid, 2-ethylhexanoic acid, capric acid, lauric acid, myristic acid, palmitic acid, stearic acid, oleic acid, linoleic acid, and α-linolenic acid. Specific examples of the fatty acid also include cyclic alkylcarboxylic acids, such as cyclohexanecarboxylic acid. The hydroxyfatty acid may be a compound containing 3 to 24 carbon atoms, and having one or more (for example, one) hydroxyl groups. Examples of the hydroxyfatty acid include 2-hydroxydecanoic acid, 2-hydroxydodecanoic acid, 2-hydroxytetradecanoic acid, 2-hydroxyhexadecanoic acid, 2-hydroxyoctadecanoic acid, 2-hydroxyeicosanoic acid, 2-hydroxydocosanoic acid, 2-hydroxytricosanoic acid, 2-hydroxytetracosanoic acid, 3-hydroxyhexanoic acid, 3-hydroxyoctanoic acid, 3-hydroxynonanoic acid, 3-hydroxydecanoic acid, 3-hydroxyundecanoic acid, 3-hydroxydodecanoic acid, 3-hydroxytridecanoic acid, 3-hydroxytetradecanoic acid, 3-hydroxyhexadecanoic acid, 3-hydroxyheptadecanoic acid, 3-hydroxyoctadecanoic acid, ω-hydroxy-2-decenoic acid, ω-hydroxypentadecanoic acid, ω-hydroxyheptadecanoic acid, ω-hydroxyeicosanoic acid, ω-hydroxydocosanoic acid, 6-hydroxyoctadecanoic acid, ricinoleic acid, 12-hydroxystearic acid, and [R-(E)]-12-hydroxy-9-octadecenoic acid. Preferred among the above are hydroxyfatty acids containing 4 to 18 carbon atoms, and having one hydroxyl group at a position other than the ω-position (particularly the 12-position), and more preferred are ricinoleic acid and 12-hydroxystearic acid. These fatty acids may be used alone or in combination. Likewise, these hydroxyfatty acids may be used alone or in combination.

In the silver nanoparticles of the present invention, as with the amine compound, the amount of the fatty acid or the hydroxyfatty acid to be adhered is adjusted such that the exothermic peak due to binding of the silver nanoparticles in thermogravimetry-differential thermal analysis appears at less than 175° C., and a weight loss on heating from 30 to 500° C. by thermogravimetry-differential thermal analysis is 0.4% by weight or less. Specifically, the amount of the fatty acid or the hydroxyfatty acid to be adhered may be 0.3% by weight or less, and is preferably 0.1% by weight or less, based on the weight of the silver nanoparticles. The fatty acid or hydroxyfatty acid content adhered to the silver nanoparticles can be measured by gas chromatography or thermogravimetry-differential thermal analysis.

As long as the silver nanoparticles of the present invention satisfy the above-described average particle diameter and physical properties, the amine compound, the fatty acid, and the hydroxyfatty acid may be used in combination, or another compound different from these compounds may be adhered to the surface of the silver nanoparticles. From the viewpoint of setting the average particle diameter of the silver nanoparticles in the above-described range, and also imparting the above-described physical properties to the silver nanoparticles, it is particularly preferred that the amine compound be adhered to the surface of the silver nanoparticles of the present invention.

2. Method for Producing the Silver Nanoparticles

One example of a method for producing the silver nanoparticles of the present invention will be hereinafter described.

Initially, a composition for producing the silver nanoparticles (silver nanoparticle-preparation composition) is prepared. Specifically, a silver compound as a raw material of the silver nanoparticles, and optionally, the amine compound and the like to be adhered to the surface of the silver nanoparticles and a solvent, are prepared. In order to set the average particle diameter of the silver nanoparticles of the present invention in the above-described range, and also impart the above-described physical properties to the silver nanoparticles, the silver compound is preferably silver nitrate, silver oxalate, or the like, and is particularly preferably silver oxalate. Examples of the solvent include the same solvents as those mentioned as the solvent to be contained in the conductive adhesive described below. These components are then mixed to obtain a silver nanoparticle-preparation composition. The proportions of these components in the composition are appropriately adjusted. For example, the silver oxalate content in the composition is preferably about 20 to 70% by mass, based on the total amount of the composition. When the amine compound is adhered to the surface of the silver nanoparticles, the amine compound content is preferably about 5 to 55% by mass, based on the total amount of the composition. When the fatty acid is adhered to the surface of the silver nanoparticles, the fatty acid content is preferably about 0.1 to 20% by mass, based on the total amount of the composition. When the hydroxyfatty acid is adhered to the surface of the silver nanoparticles, the hydroxyfatty acid content is preferably about 0.1 to 15% by mass, based on the total amount of the composition.

Alternatively, the following method can be adopted: Using a silver nanoparticle-preparation composition adjusted such that the contents of the amine compound and the like fall outside the above-described ranges, silver nanoparticles are synthesized first, and then the types and amounts of the amine compound and the like to be adhered are adjusted (the amine compound is replaced) to achieve the above-described physical properties, using the below-described method.

The means of mixing the components is not limited, and the mixing may be performed using a general-purpose device, such as a mechanical stirrer, a magnetic stirrer, a vortex mixer, a planetary mill, a ball mill, a three-roll, a line mixer, a planetary mixer, or a dissolver. In order to avoid an increase in the temperature of the composition due to the influence of the heat of dissolution, frictional heat, and the like during mixing, which may initiate the pyrolysis reaction of the silver nanoparticles, it is preferred to perform the mixing while keeping the temperature of the composition at, for example, 60° C. or less, particularly 40° C. or less.

The silver nanoparticle-preparation composition is then reacted, typically by heating, in a reaction vessel, to cause the pyrolysis reaction of the silver compound, resulting in the formation of silver nanoparticles. The reaction may be performed by introducing the composition into a previously heated reaction vessel, or introducing the composition into a reaction vessel and then heating.

The reaction temperature may be any temperature that allows the pyrolysis reaction to proceed, and allows the silver nanoparticles to form, for example, about 50 to 250° C. The reaction time may be selected appropriately according to the desired size of the average particle diameter and the corresponding composition of the composition. The reaction time is, for example, from 1 minute to 100 hours.

The silver nanoparticles formed by the pyrolysis reaction are obtained as a mixture containing unreacted raw material, and thus, are preferably purified. Examples of purification methods include solid-liquid separation methods and a sedimentation method utilizing the difference in specific gravity between the silver nanoparticles and the unreacted raw material such as an organic solvent. Examples of solid-liquid separation methods include filtration, centrifugation, a cyclone method, and decantation. For ease of handling during purification, the viscosity of the mixture containing the silver nanoparticles may be adjusted by diluting it with a low-boiling-point solvent, such as acetone or methanol.

The average particle diameter of the silver nanoparticles to be obtained can be adjusted by adjusting the composition and reaction conditions of the composition for producing the silver nanoparticles.

Method of Replacing and Adjusting the Amine Compound on the Surface of the Silver Nanoparticles Silver nanoparticles (in which an amine compound is adhered to the surface) synthesized first using the method described above are prepared and then dispersed in a solvent. Examples of the solvent include the same solvents as those mentioned as the solvent to be contained in the conductive adhesive described below. Then, another amine compound is added in an amount in the range of 0.1 to 5 times the mass of the silver nanoparticles, and the mixture is subjected to the step of stirring for 1 minute to 24 hours at room temperature to 80° C. As a result, the type of the amine compound adhered to the surface of the silver nanoparticles can be replaced, and the amount of the amine compound to be adhered can be adjusted. The silver nanoparticles in which the amine compound has been replaced can be collected using the above-described solid-liquid separation methods, for example.

3. Conductive Adhesive

The conductive adhesive of the present invention is characterized by comprising the silver nanoparticles of the present invention and a solvent. The inclusion of the solvent improves flowability, which facilitates placing the conductive adhesive of the present invention in a desired place. Details of the silver nanoparticles of the present invention are as described above.

Although the solvent is not limited as long as it can disperse the silver nanoparticles, it preferably contains a polar organic solvent. Examples of the polar organic solvent include ketones, such as acetone, acetylacetone, and methyl ethyl ketone; ethers, such as diethyl ether, dipropyl ether, dibutyl ether, tetrahydrofuran, and 1,4-dioxane; diols, such as 1,2-propanediol, 1,2-butanediol, 1,3-butanediol, 1,4-butanediol, 2,3-butanediol, 1,2-hexanediol, 1,6-hexanediol, 1,2-pentanediol, 1,5-pentanediol, 2-methyl-2,4-pentanediol, 3-methyl-1,5-pentanediol, 1,2-octanediol, 1,8-octanediol, and 2-ethyl-1,3-hexanediol; glycerol; alcohols, such as linear or branched alcohols containing 1 to 5 carbon atoms, cyclohexanol, 3-methoxy-3-methyl-1-butanol, and 3-methoxy-1-butanol; fatty acid esters, such as ethyl acetate, butyl acetate, ethyl butylate, and ethyl formate; glycols or glycol ethers, such as polyethylene glycol, triethylene glycol monomethyl ether, tetraethylene glycol monomethyl ether, ethylene glycol monoethyl ether, diethylene glycol monoethyl ether, diethylene glycol dimethyl ether, triethylene glycol dimethyl ether, tetraethylene glycol dimethyl ether, 3-methoxybutyl acetate, ethylene glycol monobutyl ether, ethylene glycol monobutyl ether acetate, ethylene glycol monohexyl ether, ethylene glycol monooctyl ether, ethylene glycol mono-2-ethylhexyl ether, ethylene glycol monobenzyl ether, diethylene glycol monomethyl ether, diethylene glycol monomethyl ether acetate, diethylene glycol monoethyl ether, diethylene glycol monoethyl ether acetate, diethylene glycol monobutyl ether, diethylene glycol monobutyl ether acetate, diethylene glycol monohexyl ether, diethylene glycol mono-2-ethylhexyl ether, polypropylene glycol, propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, tripropylene glycol monomethyl ether, tripropylene glycol monoethyl ether, tripropylene glycol monopropyl ether, and tripropylene glycol monobutyl ether; N,N-dimethylformamide; dimethylsulfoxide; terpenes, such as terpineol; acetonitrile; γ-butyrolactone; 2-pyrrolidone; N-methylpyrrolidone; and N-(2-aminoethyl)piperazine. From the viewpoint of more effectively improving the mechanical strength of the sintered body of the conductive adhesive, preferred among the above are linear or branched alcohols containing 3 to 5 carbon atoms, 3-methoxy-3-methyl-1-butanol, 3-methoxy-1-butanol, diethylene glycol monobutyl ether, diethylene glycol monobutyl ether acetate, and terpineol.

The solvent may also contain a nonpolar or hydrophobic solvent, in addition to the polar organic solvent. Examples of the nonpolar organic solvent include linear, branched, or cyclic saturated hydrocarbons, such as hexane, heptane, octane, nonane, decane, 2-ethylhexane, and cyclohexane; alcohols, such as linear or branched alcohols containing 6 or more carbon atoms; aromatic compounds, such as benzene, toluene, and benzonitrile; halogenated hydrocarbons, such as dichloromethane, chloroform, and dichloroethane; methyl-n-amyl ketone; methyl ethyl ketone oxime; and triacetin. Preferred among the above are saturated hydrocarbons and linear or branched alcohols containing 6 or more carbon atoms, and more preferred are hexane, octane, decane, octanol, decanol, and dodecanol. These solvents may be used alone or as a mixture of two or more.

When the solvent contains both a polar organic solvent and a nonpolar organic solvent, the proportion of the polar organic solvent is preferably 5% by volume or more, more preferably 10% by volume or more, and still more preferably 15% by volume or more, based on the total volume of the solvent. The proportion of the polar organic solvent may also be 60% by volume or less, 55% by volume or less, or 50% by volume or less. The solvent may contain a polar organic solvent only. Even when the conductive adhesive of the present invention contains a large amount of polar organic solvent as in this case, it has good dispersibility of the silver nanoparticles.

Although the proportion of the solvent is not limited in the conductive adhesive of the present invention, it is preferably 20% by mass or less, and is more preferably about 5 to 15% by mass.

The silver nanoparticle content in the conductive adhesive of the present invention is preferably 80% by mass or more, and more preferably 85% by mass or more.

The conductive adhesive of the present invention can be produced using a method comprising the step of mixing the silver nanoparticles of the present invention and the solvent.

Furthermore, in the method for producing the conductive adhesive of the present invention, the silver nanoparticles of the present invention formed in the solvent, in the above-described method for producing the silver nanoparticles of the present invention, may be used together with the solvent as the conductive adhesive of the present invention.

4. Sintered Body of the Conductive Adhesive

The sintered body of the conductive adhesive of the present invention is obtained by sintering the conductive adhesive of the present invention described in detail in the "2. Conductive adhesive" section above. In the sintered body of the conductive adhesive of the present invention, the components (amine compound and the like) adhered to the surface of the silver nanoparticles and the solvent have been mostly eliminated by the high heat applied during sintering, and the sintered body is substantially composed of silver.

Although the sintering temperature is not limited, it is preferably about 150 to 200° C., and more preferably about 150 to 185° C., from the viewpoint of imparting high conductivity and high adhesion force to the sintered body to be obtained, and simultaneously effectively improving the mechanical strength. From the same viewpoint as described above, the sintering time is preferably about 0.4 to 2.0 hours, and more preferably about 0.5 to 1.2 hours. Sintering of conventional silver nanoparticles with a large particle diameter (for example, an average particle diameter of 200 nm or more) at a low temperature of 200° C. or less results in insufficient sintering, and is difficult to produce a sintered body having a high shear strength and a low specific resistance. In contrast, by using the conductive adhesive containing the silver nanoparticles of the present invention, a sintered body having a high shear strength and a low specific resistance is obtained when the silver nanoparticles are sintered at a low temperature of 200° C. or less, even though the silver nanoparticles have an average particle diameter as large as 200 nm or more. The sintering can be performed in an atmosphere such as air or an inert gas (nitrogen gas or argon gas). The sintering means is not limited, and includes, for example, an oven, a hot air-type drying oven, an infrared drying oven, laser irradiation, flash lamp irradiation, and microwaves.

Although the crystallite diameter of the sintered body of the present invention is not limited, the lower limit is preferably 75 nm or more, and more preferably 80 nm or more, while the upper limit is preferably 95 nm or less, and more preferably 90 nm or less. The method of measuring the crystallite diameter of the sintered body of the present invention is the same as the above-described method of measuring the crystallite diameter of the silver nanoparticles.

5. Device

The device of the present invention comprises a region between components that is bonded with the sintered body of the present invention. That is, the device of the present invention is obtained by placing the conductive adhesive of the present invention described in detail in the "2. Conductive adhesive" section above between components of the device (for example, between components included in a circuit), and sintering the conductive adhesive to bond the components.

As described above, the sintered body of the present invention has a high shear strength and a low specific resistance, and thus, the device or circuit comprising the sintered body also has a high shear strength between the components, and has a low specific resistance.

EXAMPLES

The present invention will be described in more detail with the following examples; however, the present invention is not limited thereto.

Details of the components used in the examples and comparative examples are as follows:
Silver oxalate ((COOAg)2) was synthesized using the method disclosed in Japanese Patent No. 5574761.
N,N-diethyl-1,3-diaminopropane (available from Wako Pure Chemical Industries, Ltd.)
2-(2-Aminoethoxy)ethanol (available from Wako Pure Chemical Industries, Ltd.)

n-Hexylamine (containing 6 carbon atoms, available from Wako Pure Chemical Industries, Ltd.)

Butanol (available from Wako Pure Chemical Industries, Ltd.)

Methanol (available from Wako Pure Chemical Industries, Ltd.)

Product name AG 2-1C available from DOWA Electronics Materials Co., Ltd. was used as the silver nanoparticles of Comparative Example 1.

Product name AGS-050 available from Tokuriki Honten Co., Ltd. was used as the silver nanoparticles of Comparative Example 2.

Example 1

In 50-mL glass centrifuge tubes with a magnetic stirring bar, N,N-diethyl-1,3-diaminopropane (1.72 g), 2-(2-aminoethoxy)ethanol (1.39 g), and butanol (6.0 g) were placed and stirred for about 1 minute, and then silver oxalate (4.0 g) was placed and stirred for about 10 minutes to obtain a silver nanoparticle-preparation composition. Thereafter, these glass centrifuge tubes were set upright on a hot stirrer equipped with an aluminum block (HHE-19G-U available from Koike Precision Instruments), and stirred for 30 minutes at 40° C. and additionally for 30 minutes at 90° C. After being left to cool, the magnetic stirring bar was removed, 15 g of methanol was added to the composition and stirred with a vortex mixer, the composition was then subjected to centrifugation at 3000 rpm (about 1600×G) for 1 minute using a centrifuge (CF7D2 available from Hitachi Koki Co., Ltd.), and the supernatant was removed by tilting the centrifuge tubes. The process of adding 15 g of methanol, stirring, centrifugation, and removing the supernatant was repeated twice to collect produced silver nanoparticles A.

(Replacement of the Amine Compound)

To the dispersion (methanol solution) of the silver nanoparticles A obtained above, n-hexylamine was added in an amount equivalent to the mass of the silver nanoparticles, and stirred for 4 hours at room temperature. After stirring, the magnetic stirring bar was removed, 15 g of methanol was added to the composition and stirred with a vortex mixer, the composition was then subjected to centrifugation at 3000 rpm (about 1600×G) for 1 minute using a centrifuge (CF7D2 available from Hitachi Koki Co., Ltd.), and the supernatant was removed by tilting the centrifuge tubes. The process of adding 15 g of methanol, stirring, centrifugation, and removing the supernatant was repeated twice to collect silver nanoparticles 1 of Example 1 in which the proportion of the amine in the protective layer was adjusted (replaced).

Example 2

In 50-mL glass centrifuge tubes with a magnetic stirring bar, 2-(2-aminoethoxy)ethanol (2.91 g) and butanol (6.0 g) were placed and stirred for about 1 minute, and then silver oxalate (4.0 g) was placed and stirred for about 10 minutes to obtain a silver nanoparticle-preparation composition. Thereafter, these glass centrifuge tubes were set upright on a hot stirrer equipped with an aluminum block (HHE-19G-U available from Koike Precision Instruments), and stirred for 30 minutes at 40° C. and additionally for 30 minutes at 90° C. After being left to cool, the magnetic stirring bar was removed, 15 g of methanol was added to the composition and stirred with a vortex mixer, the composition was then subjected to centrifugation at 3000 rpm (about 1600×G) for 1 minute using a centrifuge (CF7D2 available from Hitachi Koki Co., Ltd.), and the supernatant was removed by tilting the centrifuge tubes. The process of adding 15 g of methanol, stirring, centrifugation, and removing the supernatant was repeated twice to collect produced silver nanoparticles B.

(Replacement of the Amine Compound)

Using the silver nanoparticles A instead of the silver nanoparticles A, silver nanoparticles 2 of Example 2 were collected as with the above-described silver nanoparticles A.

<Measurement of the Average Particle Diameter>

The average particle diameter of the silver nanoparticles of each of Examples 1 and 2, and Comparative Examples 1 and 2 was determined by observing the silver nanoparticles with a scanning electron microscope (VE-7800 available from KEYENCE, S-4500 available from Hitachi High-Technologies Corporation) (magnification: 20,000 times), randomly selecting 30 particles present in the field of view, measuring the particle diameters, and calculating the average value. The results are shown in Table 1.

<Production of Conductive Adhesives>

To the silver nanoparticles of each of Examples 1 and 2, and Comparative Examples 1 and 2, Texanol was added to give a silver content of 85% by mass to obtain a silver nanoparticle dispersion. The dispersion was mixed twice using MAZERUSTAR available from Kurabo Industries Ltd. in the stirring priority mode to prepare a conductive adhesive.

<Thermogravimetry-Differential Thermal Analysis (TG-DTA)>

1 g of each conductive adhesive was dispersed well in 2 g of added methanol, and then the silver nanoparticles were collected by filtration and air-dried to obtain a silver-nanoparticle dry powder. TG-DTA measurement was performed on the dry powder, using HITACHI G300 AST-2. The measurement conditions were as follows: atmosphere: air, measurement temperature: 30 to 500° C., heating rate: 10° C./min. From the obtained TG-DTA chart, the exothermic peak due to binding of the silver nanoparticles by the TG-DTA analysis and the weight loss on heating from 30 to 500° C. by the thermal analysis were acquired. The results are shown in Table 1.

<Measurement of the Crystallite Diameter>

The average crystallite diameter of each of the silver nanoparticles and the average crystallite diameter of the sintered body of each conductive adhesive (coating obtained under a sintering condition of 60 minutes at 200° C.) were determined by performing X-ray crystal structure analysis using RIGAKU Ultima IV (radiation source: Cu Kα radiation). The crystallite diameters were calculated from the half-width of the (111) peak (2θ=38°) in the obtained chart, using the Scherrer equation. The results are shown in Table 1.

<Measurement of the Shear Strength of the Coating (Sintered Body)>

A substrate formed of a copper sheet coated with 0.5 µm of electroless silver plating was prepared, and each conductive adhesive was uniformly applied onto the substrate to give a coating thickness of 50 µm using a metal mask, to form a coating. On the coating, a silicon wafer (size: 2 mm×2 mm) gold-plated or gold-sputtered on the rear surface (surface brought into contact with the conductive adhesive) was placed. Then, the coating was heated using a (circulation-type) dryer under a predetermined sintering condition (30 minutes at 175° C. or 60 minutes at 200° C.) to obtain a coating in which the conductive adhesive was sintered (sintered body). The shear strength of each coating (sintered body) was measured by performing a die shear test using a bond tester (SS30-WD available from Seishin Trading Co., Ltd.). The measurement results are shown in Table 1.

<Measurement of the Specific Resistance of the Coating>

Each conductive adhesive was applied onto a polyimide film to give a size of 2 mm×60 mm×50 µm using a metal mask, to form a coating. Then, the coating was heated under a predetermined sintering condition (30 minutes at 175° C. or 60 minutes at 200° C.) to obtain a coating in which the conductive adhesive was sintered (sintered body). The resistance of the sintered body was measured using a resistance meter (HIOKI RM3548), and the specific resistance was determined. The results are shown in Table 1.

TABLE 1

|  |  | Ex. 1 | Ex. 2 | Comp. Ex. 1 | Comp. Ex. 2 |
|---|---|---|---|---|---|
| Silver nanoparticles | Average particle diameter (nm) | 240 | 313 | 358 | 640 |
|  | Proportion (%) of the number of particles with particle diameters of 100 to 200 nm | 36 | 10 | 7 | 0 |
|  | Crystallite diameter (nm) | 43 | 47 | 41 | 27 |
|  | TG-DTA exothermic peak (° C.) | 173 | 169 | 243 | 229 |
|  | TG-DTA weight loss (% by weight) | 0.1 | 0.1 | 0.5 | 3.6 |
| Coating (sintered body) | Crystallite diameter (nm) | 85 | 83 | 92 | 68 |
|  | Shear strength (Mpa) of the coating — 30 min at 175° C. | 28 | 28 | 6 | 1 |
|  | Shear strength (Mpa) of the coating — 60 min at 200° C. | 58 | 59 | 40 | 12 |
|  | Specific resistance (μm · cm) of the coating — 30 min at 175° C. | 3.5 | 4.8 | 8.5 | 23.8 |
|  | Specific resistance (μm · cm) of the coating — 60 min at 200° C. | 3.5 | 3.5 | 7.1 | 12.1 |

As shown in Table 1, the coatings obtained from the conductive adhesives containing the silver nanoparticles (of Examples 1 and 2) having a TG-DTA exothermic peak of less than 175° C. and a TG-DTA weight loss of 0.4% by weight or less exhibited higher shear strengths and lower specific resistances, compared to the conductive adhesives containing particles having a TG-DTA exothermic peak higher than 175° C. and a TG-DTA weight loss above 0.4% by weight.

The invention claimed is:

1. Silver nanoparticles having an average particle diameter of 240 nm to 500 nm, wherein a proportion of the number of particles with particle diameters of 100 to 200 nm is 10%-29%, wherein an exothermic peak due to binding of the silver nanoparticles to each other in thermogravimetry-differential thermal analysis appears at less than 175° C., and a weight loss on heating from 30 to 500° C. by thermogravimetry-differential thermal analysis is 0.4% by weight or less.

2. The silver nanoparticles according to claim 1, wherein an amine compound is adhered to a surface of the silver nanoparticles.

3. A conductive adhesive comprising the silver nanoparticles according to claim 1 and a solvent.

4. A sintered body of the conductive adhesive according to claim 3.

5. A device in which components are bonded with the sintered body according to claim 4.

6. A conductive adhesive comprising the silver nanoparticles according to claim 2 and a solvent.

7. A sintered body of the conductive adhesive according to claim 6.

8. A device in which components are bonded with the sintered body according to claim 7.

9. The silver nanoparticles according to claim 1, wherein the silver nanoparticles have an average particle diameter of 250 nm to 500 nm.

* * * * *